United States Patent
Teixeira et al.

(10) Patent No.: US 9,137,758 B2
(45) Date of Patent: Sep. 15, 2015

(54) PROCESS FOR CONTROLLING THE TRANSMISSION POWER IN THE UPLINK COMMUNICATION CHANNEL, AND UE FOR DOING THE SAME

(75) Inventors: Filipe Teixeira, Pruille-le-Chetif (FR); Laurent De Luca, L'Hermitage (FR); Anne Gourden, Le Mans (FR)

(73) Assignee: ST-ERICSSON SA, Plan-Les-Ouates (CH)

( * ) Notice: Subject to any disclaimer, the term of this patent is extended or adjusted under 35 U.S.C. 154(b) by 323 days.

(21) Appl. No.: 13/881,185

(22) PCT Filed: Nov. 14, 2011

(86) PCT No.: PCT/EP2011/005725
§ 371 (c)(1),
(2), (4) Date: Apr. 24, 2013

(87) PCT Pub. No.: WO2012/062481
PCT Pub. Date: May 18, 2012

(65) Prior Publication Data
US 2013/0217405 A1     Aug. 22, 2013

Related U.S. Application Data

(60) Provisional application No. 61/427,383, filed on Dec. 27, 2010.

(30) Foreign Application Priority Data

Nov. 12, 2010 (EP) .................................... 10368042

(51) Int. Cl.
*H04B 7/00* (2006.01)
*H04W 52/14* (2009.01)
(Continued)

(52) U.S. Cl.
CPC .......... *H04W 52/146* (2013.01); *H04W 52/325* (2013.01); *H04W 52/367* (2013.01)

(58) Field of Classification Search
CPC ............ H04W 52/146; H04W 52/325; H04W 52/367
USPC ...................... 455/522, 69, 571, 67.11–67.16
See application file for complete search history.

(56) References Cited

U.S. PATENT DOCUMENTS 6,029,074 A * 2/2000 Irvin .............................. 455/571
6,580,919 B1 * 6/2003 Saito ............................. 455/522
(Continued)

FOREIGN PATENT DOCUMENTS

EP   0 949 768 A2   10/1999
GB   2 339 112 A    1/2000
(Continued)

OTHER PUBLICATIONS

International Search Report issued in corresponding International application No. PCT/EP2011/005725, mailing date Jan. 23, 2012.
(Continued)

*Primary Examiner* — Sharad Rampuria
(74) *Attorney, Agent, or Firm* — Patent Portfolio Builders PLLC

(57) ABSTRACT

A process for controlling the power transmission in the uplink of the User Equipment communicating with a Base Station in a GSM wireless communication system, said process including the steps of:

initializing an audio/speech/data transmission channel;

monitoring the power control commands generated by said Base station, said command determining a power transmission strength to be used by the UE, said power transmission strength being within a power transmission window;

determining for each block to be transmitted whether it includes a control channel or a traffic/idle channel;

applying, in response to said determination, a first power transmission level in case of a control block or a second power transmission level in case of a traffic/idle block, both power transmission levels being included within said range transmission window and the first power transmission level being higher for FACCH blocks than the second power transmission level used for traffic data; and transmitting said block and repeating the preceding step until the receipt of a new power control command.

7 Claims, 4 Drawing Sheets

(51) Int. Cl.
*H04W 52/32* (2009.01)
*H04W 52/36* (2009.01)

(56) References Cited

U.S. PATENT DOCUMENTS

| | | | | |
|---|---|---|---|---|
| 6,658,262 | B1 * | 12/2003 | Lundborg | 455/522 |
| 6,744,742 | B1 * | 6/2004 | Koskela et al. | 370/318 |
| 8,948,031 | B2 * | 2/2015 | Yu et al. | 370/252 |
| 2005/0261017 | A1 * | 11/2005 | Vaittinen et al. | 455/522 |
| 2011/0143805 | A1 * | 6/2011 | Ramasamy et al. | 455/522 |
| 2011/0170482 | A1 * | 7/2011 | Dhanda | 370/328 |
| 2011/0305181 | A1 * | 12/2011 | Svedevall et al. | 370/311 |
| 2013/0028202 | A1 * | 1/2013 | Hofmann | 370/329 |

FOREIGN PATENT DOCUMENTS

| | | |
|---|---|---|
| WO | 99/10995 A1 | 3/1999 |
| WO | 2006/117729 A1 | 11/2006 |

OTHER PUBLICATIONS

Nokia Siemens Networks, "Proposed Text for Candidate Technique Orthogonal Sub Channels in TR on Circuit Switched Voice Capacity Evolution," 3GPP Draft; GP-081248 OSC Section in TR, 3rd Generation Partnership Project (3GPP), Mobile Competence Centre; 650, Route des Lucioles, F-06921 Sophia-Antipolis Cedex, France, Aug. 23, 2008, XP050413691.

* cited by examiner

PROCESS FOR CONTROLLING THE TRANSMISSION POWER IN THE UPLINK COMMUNICATION CHANNEL, AND UE FOR DOING THE SAME

TECHNICAL FIELD

The invention relates to the field of wireless digital communications and more particularly to a process for controlling the transmission power in the uplink communication channel between a User Equipment (UE) and a Base Station (BS).

BACKGROUND ART

Wireless mobile communications have been subject to a significant development, particularly with the advent of the Global System for Mobile Communications (GSM) which is certainly one of the most popular standards for mobile telephony systems in the world.

GSM networks operate in different frequency ranges with most 2G GSM networks operating in the 900 MHz or 1800 MHz bands. As known by the skilled man, the mobiles or User Equipments communicate with and under the control of a Base Station. Generally speaking, there is a dilemma to be considered between the level of transmission in the uplink and the quality of that communication. A high level of transmission reduces the life of the battery and creates interference with the neighboring mobiles, while a low level of transmission jeopardizes the quality of the communication and might result in call drops.

In GSM, the level of the transmission power in the uplink is under the supervision of the base station (BS) which provides every UE with appropriate commands for controlling the strength of the transmission signal which is to be generated by each UE.

The consequence is that the UE has no control on the transmission power in the uplink and consequently on the possibility to extend the life of the battery.

Thus, there is a desire to improve the situation and allow the transmission power to be controlled at least partially by the UE, while avoiding significant impact on call drops.

SUMMARY OF THE INVENTION

It is an object of the present invention to achieve a process allowing the User Equipment (UE) to have at least some control over the level of the transmission power.

It is another object of the present invention to achieve a process allowing the reduction of the level of transmission in the uplink while minimizing the call drops.

It is still another object of the present invention to achieve a User Equipment having better and closer control over the level of power transmission in the uplink.

These and other objects are achieved by the process of controlling the power transmission in the uplink which includes the steps of:

initializing an audio/speech/data transmission channel;
  monitoring the power control commands generated by said Base Station, said command determining a power transmission strength to be used by the UE, said power transmission strength being within a power transmission window;
  determining for each block to be transmitted whether it includes a control channel or a traffic/idle channel;
  applying, in response to said determination, a first power transmission level in case of a control block or a second power transmission level in case of a traffic/idle block, both power transmission levels being included within said power transmission window and the first power transmission level being higher than the second power transmission level;
  transmitting said block and repeating the preceding step until the receipt of a new power control command.

In one embodiment, the control channels are a Slow Associated Control Channel (SACCH) or a Fast Associated Control Channel (FACCH).

In one particular embodiment, no increase of the power transmission is applied when the base station already requests the higher level of transmission.

The invention also achieves a user equipment for communicating with a Base Station (BS) in a GSM wireless communication system, the user equipment including:

means for initializing an audio/speech/data transmission channel;
  means for monitoring the power control commands generated by said Base Station, said command determining a power transmission strength to be used by the UE, said power transmission strength being within a power transmission window;
  means for determining for each block to be transmitted whether it includes a control channel or a traffic/idle channel;
  means for applying, in response to said determination, a first power transmission level in case of a control block or a second power transmission level in case of a traffic block, both power transmission levels being included within said range transmission window and the first power transmission level being higher for FACCH blocks than the second power transmission level used for traffic data;
  means for transmitting said block and repeating the preceding step until the receipt of a new power control command.

In one embodiment, the control channels are the SACCH-UL and FACCH-Up-Link IUL channels.

DESCRIPTION OF THE DRAWINGS

Other features of one or more embodiments of the invention will best be understood by reference to the following detailed description when read in conjunction with the accompanying drawings.

DESCRIPTION OF THE PREFERRED EMBODIMENT

There will now be described a process for controlling the transmission power in the uplink communication channel between a User Equipment (UE) and a Base Station (BS).

The process is particularly applicable in 2G full duplex wireless communication systems complying with the Global System for Mobile Communications (GSM) standard.

Figure 1:
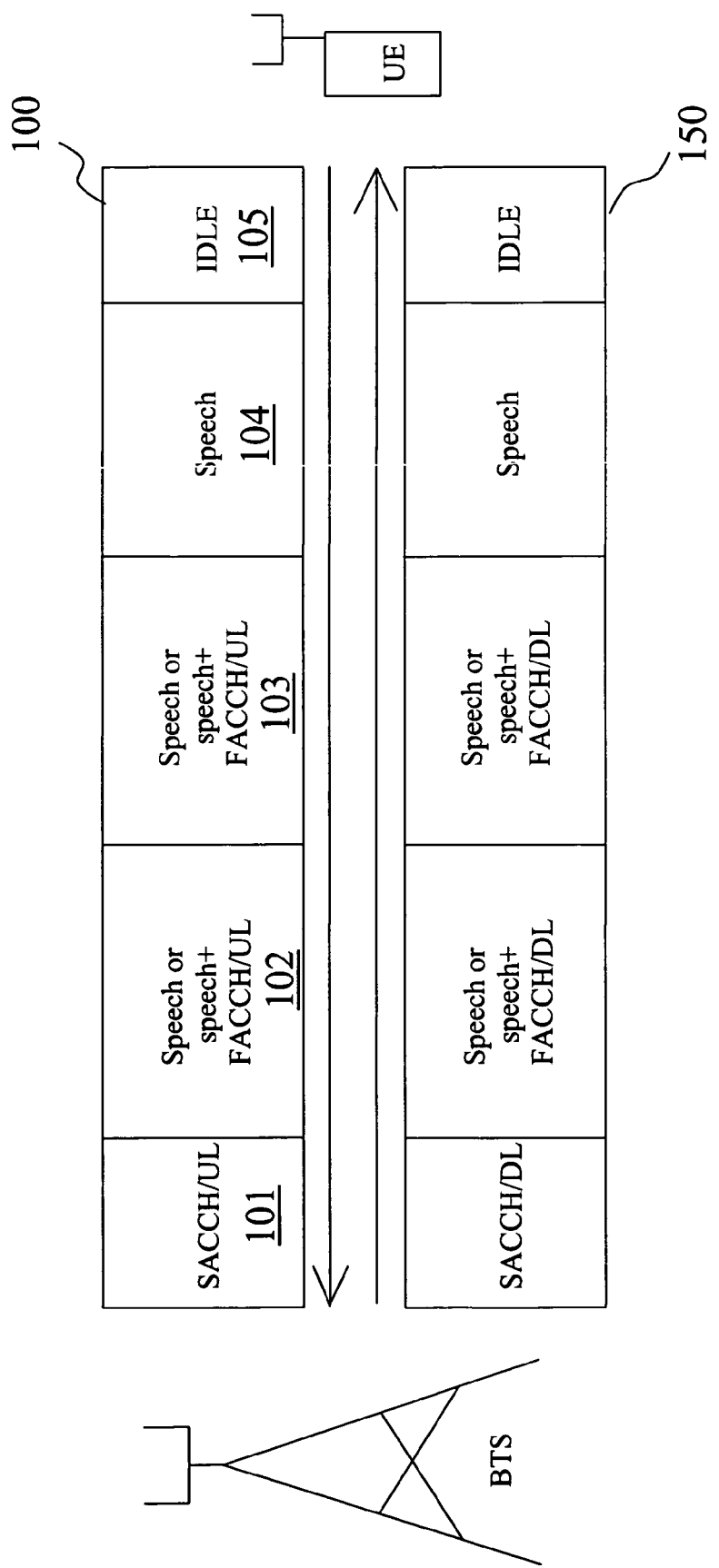
FIG. 1 illustrates channels transmissions that take place over the air interface between a User Equipment and a Base Station in GSM.

FIG. 1 more particularly illustrates the transmission over the air interface between a 2G mobile or User Equipment (UE) and a 2G Base Station (BTS) during a speech communication. One may particularly notice the basic physical channel time dividing between speech and signalling channels in uplink (UL) and in downlink (DL), respectively represented by frames 100 and 150. Signalling channels SACCH/UL and SACCH/DL (Slow Associated Control Channels) are systematically transmitted whereas signalling channel Fast Associated Control Channels FACCH/DL and FACCH/UL are not systematically transmitted. The former SACCH channels convey power control and timing information in the downlink direction (towards the mobile UE) and Receive Signal Strength Indicator (RSSI), and link quality reports in the uplink direction, while the latter FACCH channels are used to carry out user authentication, handovers and immediate assignment. Furthermore, FACCH channels are faster than SACCH and are transmitted during and after call establishment and during handover procedures. Also, the above mentioned traffic channels include voice and data traffic. Due to data interleaving, the data of FACCH block is sent over 2 physical radio blocks. Each radio block is composed of four bursts, each of 1 slot duration, sent over a 4-frames duration for each block.

FIG. 1 thus shows, in the uplink, a SACCH block 101, two consecutive blocks 102 and 103, each comprising speech or speech with interleaved FACCH, followed by a fourth block 104 of speech and, eventually, an idle burst 105. Each block comprises 4 bursts and each burst corresponds to 625 quarter bits. The control channels are defined and standardized over the geographical area covered by the UE and typically make up about 5% of the total number of channels available in the communication system while the other 95% is dedicated to traffic channels.

It should be noticed that because those signalling channels are less protected with respect to fading effects than speech channel using AMR codec, some call drops might occur in physical areas showing a weak signal. This is due because:

1—the network did not receive the handover command acknowledgement message on FACCH/UL channel.

2—the network did not receive the last measurement report sent by the GSM MS on SACCH.

The process and apparatus which will now be described with more details with respect to FIG. 2, also improves the protection of those signalling channel.

With respect to FIG. 2, the general architecture of one embodiment of a GSM transceiver will now be described, and particularly the different software and hardware blocks required for the purpose of embodying the well-known Open System Interconnect (OSI) layer 1 achieving modulation, conversion between the representation of digital data in user equipment and the corresponding signals transmitted over a communications channel, more specifically a radio link.

Figure 2:
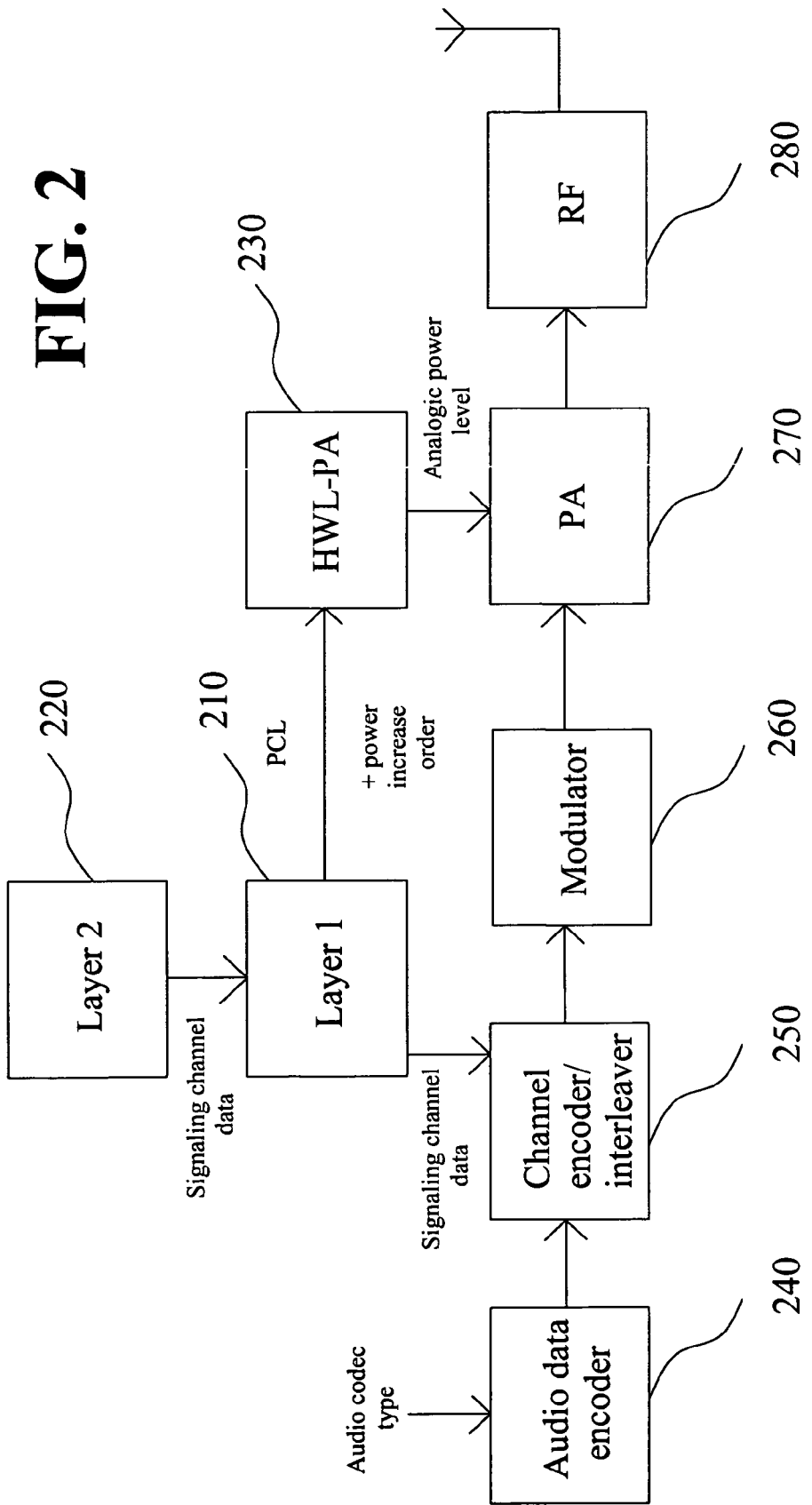
FIG. 2 illustrates the general architecture of one embodiment of a GSM transceiver.

Regarding the hardware components, the transceiver of FIG. 2 includes a chain of blocks 240, 250, 260, 270, 280 allowing the processing of speech/audio/data to be transmitted through the physical channel, which is the air. An Audio/data encoder 240 receiving speech or audio signal and generating encoded bursts of speech/audio which are then forwarded to a first input of a Channel encoder/interleaver 250 which introduces redundancy to increase the robustness of the encoded data. The output of Channel encoder/interleaver 250 is then forwarded to the input of a modulator 260, the output of which is being coupled to the input of a power amplifier 270. In one particular embodiment, power amplifier 270 has one control lead 231 allowing control of the level of transmission of the signal. Alternatively, control lead 231 may be replaced by a control register allowing the control of the level of amplification. The resulting amplified speech/audio bursts are then forwarded to a Radio Frequency Block 280, prior to the transmission through an antenna.

Focusing more specifically on the software components, one sees that the transceiver further includes a block 210 embodying the general OSI Layer 1 protocols and procedures and which is also associated with a more specific block 230 (HWL-PA). This block 230 is dedicated to the particular control of the power amplifier 270.

The representation given in FIG. 2 shows that, thanks to the HWL-PA block 230, the OSI layer 1 block 210 is able to generate an appropriate instruction (illustrated in FIG. 2 by a "power increase order" for instance), which is received by the HWL-PA block 230 for generating an appropriate Power Control signal for the Power Amplifier 270.

Layer 1 block 210 also communicates with a block 220 embodying the so-called layer 2 of the OSI architecture in accordance with protocols and procedures well known to a skilled man.

One sees from the above architecture that, while the audio/speech bursts are generated by the audio data encoder and are conveyed through the chain of blocks 240, 250, 260, 270, 280 and then to the antenna, signalling data comes from blocks 210 embodying Layer 1 set of protocols, and also communicating with link control layer 2.

Therefore, bursts of audio/voice can be interleaved with signalling data as illustrated in FIG. 1, and more specifically in blocks 101, 102 and 103 of FIG. 1.

Figure 3:
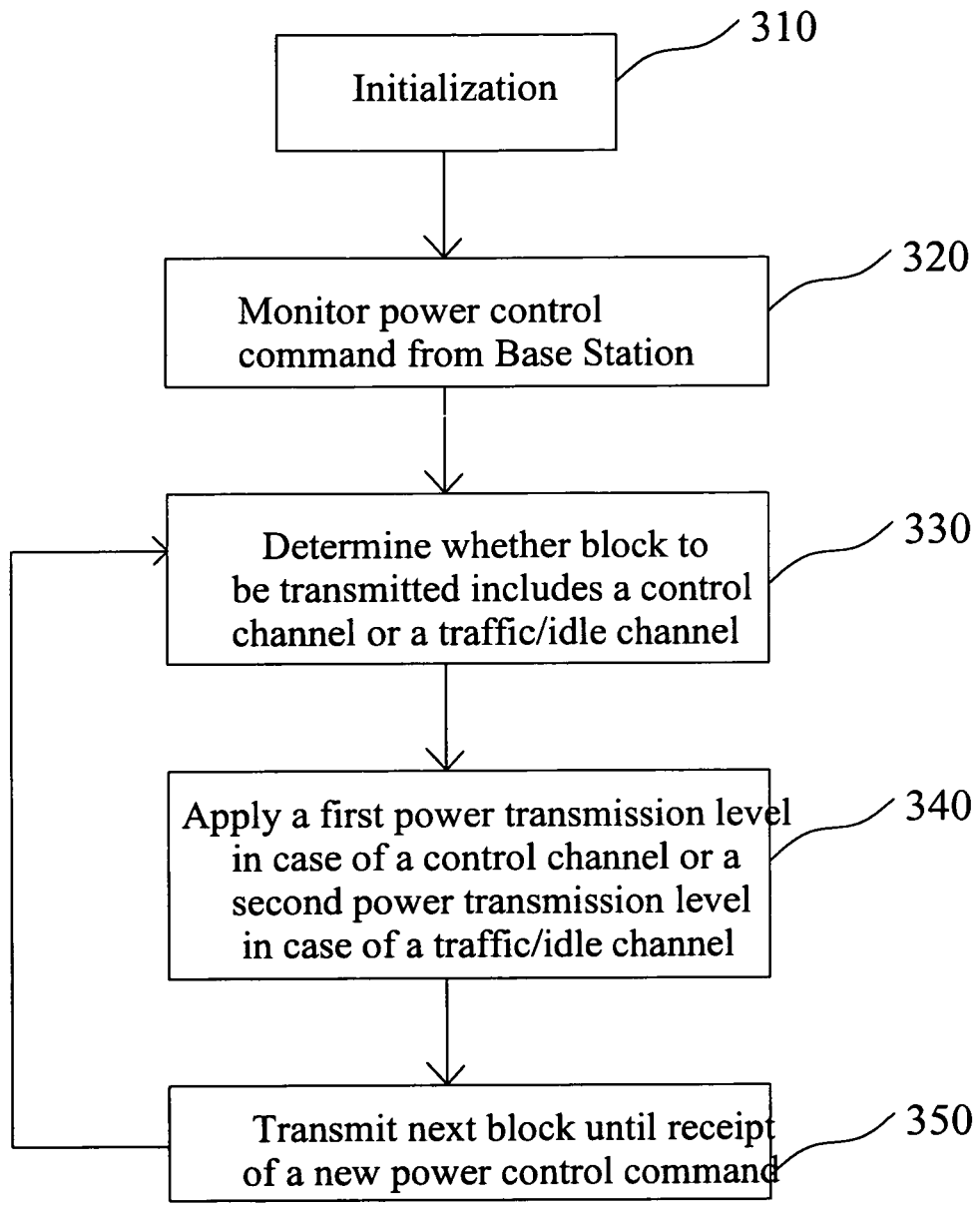
FIG. 3 illustrates one embodiment of a process controlling the level of the transmission in the uplink.

Referring to FIG. 3, there will now be described one embodiment of a process for controlling the transmission power.

In a step 310, the process starts with the initialization of a speech/audio/data communication channels by means of conventional routines and procedures which are well known to a skilled man and which will not be further explained.

Once the communication channel is established, the process then monitors, in a step 320, the receipt of Power Control commands from the Base Station for the purpose of setting the particular level of amplification of Power Amplifier 270. Power Control in GSM is managed by the BSS which regulates the signal strength generated from the Base Station. Uplink and downlink power control may be applied independently of one another and independently of any individual mobile station. It should be noticed that, generally speaking, the power control which is received by the UE defines a predetermined level of signal which is to be transmitted through the antenna, with a particular window showing a minimum and a maximum value, defining a range.

A step 330, determines the nature of the bursts which are to be transmitted through the antenna, and particularly if the considered burst includes a SACCH or FACCH information as illustrated in FIG. 1.

Then, in accordance with the determination performed in step 330, the process then proceeds, in a step 340, with a fine tuning of the control signal transmitted at the input 231 of PA block 270.

More particularly, in step 340, the process applies a first predetermined value of the transmission power—within the above mentioned window—in the case of a control channel and also applies a second—lower—predetermined value of power transmission in the case of a traffic/idle channel.

The two levels are included in the particular range or window defined by the Base Station.

Figure 4:
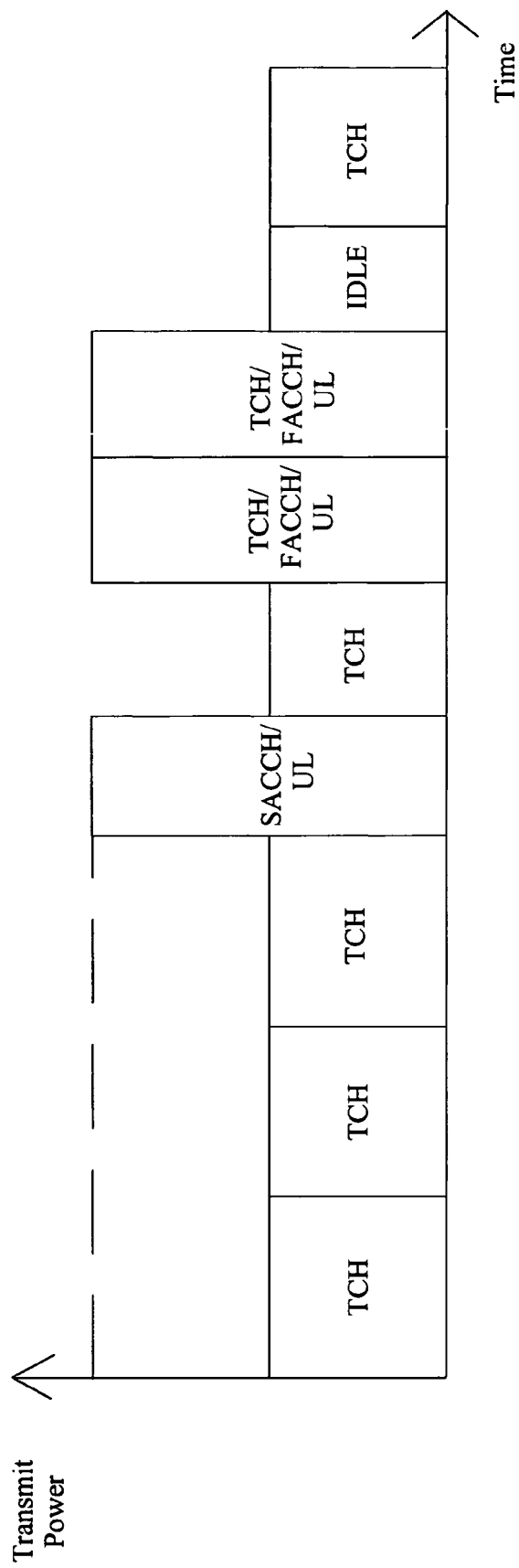
FIG. 4 is a time diagram showing the effect of the process on the transmitted blocks.

FIG. 4 more particularly illustrates the time diagram of the level of transmission of the blocks.

As an example, if one considers the particular Power Control level corresponding to 30 dBm, the first and second predetermined value may both vary in the range of 28-32 dBm. In particular, the former may be set to 28 dBm while the latter may be 32 dBm. The above mentioned application of two different predetermined values of transmit power according to the type of the detected block is a very significant advantage of the invention. Indeed, increasing the transmit power in the range of 28-32 dBm for all the channel blocks, including both the control channels and the traffic or idle channels, would certainly reduce the call drops but would also increase the power consumption. Advantageously, the process of the invention sets the transmit power of the detected blocks to a superior power level (included in the range of 28-32 dBm) if the detected blocks comprise control channels, or to an inferior power level (also included in the range of 28-32 dBm) if the detected blocks comprise traffic channels. It is important to note that setting the detected blocks comprising traffic channels in an inferior power level does not jeopardize the speech communication between the UE and the BS since, the traffic channels are less sensitive to fading effects than the control channels. In that way, the process succeeds to significantly reduce the total power consumed by the UE during speech communication with the BS without damaging too much the quality of speech communication. Therefore, the mechanism of step 340 allows the UE to keep at least partial control over the level of the transmission while complying with the average value (ie the center of the window) specified by the base station.

It has been discovered, and this is a significant advantage of the invention, that even a slight or fine control on the value of the PA can result in a non negligible saving of the battery life. This is due because, as mentioned previously, 95% of the transmission is dedicated to traffic channels and thus the use of the minimum value for the transmission of the traffic channels results in a reduction of power consumption.

Indeed, a difference of a 1, 2, or 3 dB between the two levels have shown (in best case) a reduction of the power consumption of 7.5, 17, or 25% respectively, which is certainly not to be neglected.

Furthermore, since the higher value is being assigned to the bursts conveying SACCH and FACCH channels, a significant reduction of the call drops has also been noticed.

Therefore, the inventors have discovered the important impact, that a fine tuning of the level of transmission, even though such level is basically under control of the Base Station, might result in a significant effect on the power consumption and also the prevention of at least some call drops.

When the bursts have been transmitted with the appropriate level of transmission, the process then proceeds to a step 350 which consists of the processing of the next block to be transmitted until the receipt of a new power control command.

An increase of the transmit power of the UE results in a significant current overconsumption taking place in the UE. In particular, in case of an increase of 1 dB and 2 dB, there is a current overconsumption of 8% and 17% in the UE respectively (in worst case). As evoked above, the increase of power consumed by the UE reduces the battery autonomy.

The invention provides the capability to reduce the amount of power in the corner case of maximum PCL, by putting transmit power effort on fragile signalling channels and not increasing transmit power on more robust TCH/UL channels.

The present invention fits some signaling channels Uplink listed in 45.01 section 2.2 of the 3GPP standard.

The invention claimed is:

1. Process for controlling the power transmission in the uplink of a User Equipment (UE) communicating with a Base Station (BS) in a GSM wireless communication system, said process including the steps of:
    initializing an audio/speech/data transmission channel;
    monitoring the power control commands generated by said Base Station, said commands determining a power transmission strength to be used by the UE within a power transmission window;
    determining for each block to be transmitted whether it includes a control channel or a traffic channel;
    applying, in response to said determination, a first power transmission level in case of a control block or a second power transmission level in case of a traffic/idle block, both power transmission levels being included within said range transmission window and the first power transmission level being higher for Fast Associated Control Channel (FACCH) blocks than the second power transmission level used for traffic data; and
    transmitting said block (350) and repeating the preceding step until receipt of a new power control command.

2. Process according to claim 1, wherein said control channel is a Slow Associated Control Channel (SACCH) or a Fast Associated Control Channel.

3. Process according to claim 1, wherein no increase of the power transmission in applied on the control blocks when said base station already requests the higher level of transmission.

4. User Equipment for communicating with a Base Station in a GSM wireless communication system, said User Equipment comprising a transceiver includes:
    means for initializing an audio/speech/data transmission channel;
    means for monitoring the power control commands generated by said Base Station, said command determining a power transmission strength to be used by the UE, said power transmission strength being within a power transmission window;
    means for determining for each block to be transmitted whether it includes a control channel or a traffic/idle channel;
    means for applying, in response to said determination, a first power transmission level in case of a control block or a second power transmission level in case of a traffic/idle block, both power transmission levels being included within said range transmission window and the first power transmission level being higher for FACCH blocks than the second power transmission level used for traffic data; and
    means for transmitting said block and repeating the preceding step until receipt of a new power control command.

5. User Equipment according to claim 4, wherein said control channel is a Slow Associated Control Channel or a Fast Associated Control Channel.

6. User Equipment according to claim 4, wherein no increase of the power transmission in applied on the control blocks when said base station already requests the higher level of transmission.

7. User Equipment according to claim 4, wherein the User Equipment is a mobile telephone.

* * * * *

UNITED STATES PATENT AND TRADEMARK OFFICE
CERTIFICATE OF CORRECTION

PATENT NO. : 9,137,758 B2
APPLICATION NO. : 13/881185
DATED : September 15, 2015
INVENTOR(S) : Teixeira et al.

Page 1 of 1

It is certified that error appears in the above-identified patent and that said Letters Patent is hereby corrected as shown below:

In the Specification

In Column 2, Line 67, delete "Base Station" and insert -- Base Transceiver Station --, therefor.

In the Claims

In Column 6, Line 20, in Claim 1, delete "block (350)" and insert -- block --, therefor.

In Column 6, Line 26, in Claim 3, delete "in applied" and insert -- is applied --, therefor.

In Column 6, Line 57, in Claim 6, delete "in applied" and insert -- is applied --, therefor.

Signed and Sealed this
Third Day of December, 2019

Andrei Iancu
*Director of the United States Patent and Trademark Office*